United States Patent [19]

Kamionka et al.

[11] Patent Number: 4,528,624
[45] Date of Patent: Jul. 9, 1985

[54] METHOD AND APPARATUS FOR ALLOCATING MEMORY SPACE BASED UPON FREE SPACE IN DIVERSE MEMORY DEVICES

[75] Inventors: Harvey E. Kamionka; Jerry W. Pence; Dat M. Tran, all of Tucson, Ariz.

[73] Assignee: International Business Machines Corporation, Armonk, N.Y.

[21] Appl. No.: 247,198

[22] Filed: Mar. 25, 1981

[51] Int. Cl.³ ............................................. G06F 11/00
[52] U.S. Cl. .................................................... 364/200
[58] Field of Search ... 364/200 MS File, 900 MS File

[56] References Cited

U.S. PATENT DOCUMENTS

| 3,241,125 | 3/1966 | Tomasulo et al. | 364/900 |
| 3,878,513 | 4/1975 | Werner | 364/200 |
| 4,047,160 | 9/1977 | Wolf | 364/900 |
| 4,104,718 | 8/1978 | Poublan et al. | 364/200 |
| 4,121,286 | 10/1978 | Venton et al. | 364/200 |
| 4,325,120 | 4/1982 | Colley et al. | 364/200 |
| 4,393,445 | 7/1983 | Milligan et al. | 364/200 |
| 4,403,283 | 9/1983 | Myntti et al. | 364/200 |
| 4,408,274 | 10/1983 | Wheatley et al. | 364/200 |
| 4,435,752 | 3/1984 | Winkelman | 364/200 |

OTHER PUBLICATIONS

VAX II 780 TB/Cache ISBI Control Technical Description, Digital Equipment Corp., 1978.

Primary Examiner—Gareth D. Shaw
Assistant Examiner—Tim A. Wiens
Attorney, Agent, or Firm—H. F. Somermeyer

[57] ABSTRACT

Allocation of space of peripheral storage devices to host processes is based upon free or unallocated space in each such device. The device, irrespective of capacity, having the largest free space is most likely to receive a next space allocation. A central record in a multi-host system stores free space indications. In a disk storage device free space is indicated by the number of unallocated data storage record tracks for each such device.

7 Claims, 5 Drawing Figures

METHOD AND APPARATUS FOR ALLOCATING MEMORY SPACE BASED UPON FREE SPACE IN DIVERSE MEMORY DEVICES

FIELD OF THE INVENTION

The present invention relates to data processing, particularly control of peripheral or other memory devices for enhancing system operation and balancing operations of the memory devices.

BACKGROUND OF THE INVENTION

Memory devices attachable to data processing units (hosts), such as central processing units, multiprocessors and networks of such processors, either directly or via diverse communication links, are often arranged in hierarchies in accordance with performance and other parameters. Such devices are often controlled through computer programs that maintain active data sets on fast-access storage devices, while less active data sets are maintained on lower-cost storage devices. As an example, in an installation employing International Business Machines Corporation (IBM) peripheral devices, active data sets are often kept on a model 3380 disk storage apparatus while less active data sets can be stored in an IBM 3850 Mass Storage System. Further, the disk storage apparatus can be divided into a hierarchy based upon cost. Again, the IBM 3380 would be in a primary set of storage devices for operating directly with the host data processing system. Older disk storage apparatus, such as the IBM 3330 disk storage apparatus, can be in a secondary disk storage apparatus and serve as secondary volumes for storing somewhat less active data sets than those stored on the IBM 3380 disk storage apparatus.

Utilization of memory devices always employs allocation and deallocation techniques. That is, the addressable registers of the various memory devices, when allocated, are designated as being usable only by designated hosts of the data processing system or processes within a host, or for a collection of processes or hosts. Allocation is merely taking an unassigned register, herein termed as free space, and designating it for a process or a host.

For example, in so-called main memory, i.e., the memory which a host uses as a main operational memory, empty registers are identified in a queue of registers such that allocation can occur quickly. Tomasulo et al., in U.S. Pat. No. 3,241,125, employ such a technique. This technique is suitable for main memory applications; however, when a large plurality of peripheral storage devices, such as disk storage apparatus and the like, are employed, because of the large storage capacities found in peripheral storage devices, this method becomes cumbersome. As used herein, the term peripheral storage device is intended to mean a storage device having a relatively large storage capacity; such storage device can be used at the periphery of the host or can be integral thereto; this invention can apply to either application.

Generally, newer technology storage devices, such as the IBM 3380 compared to the IBM 3330 storage device, tend to be larger capacity and faster access. The amount of data storable in a given device is often referred to as a "volume of data". The IBM 3850, for example, employs addressing based upon the storage capacity of the IBM 3330 device and termed as "virtual volumes". Accordingly, the performance of a storage device can be related to the capacity of that device. This observation is particularly pertinent to operating large-capacity storage devices in that so-called data-streaming techniques can be employed for transferring large amounts of data between storage devices, between host and storage devices, through data communication links, and the like. Generally, efficiency of the entire system is improved when data streaming is employed. Accordingly, it is desired to create a greatest probability to successfully complete data-streaming transfers to a large number of storage devices. It is also desired to manage the space of all such storage devices in an extremely low-cost and efficient manner.

Most storage devices employ so-called directories or volume table of contents (VTOC) which indicate the data stored in the memory device or volume, the amount of free space, and other control information interesting for the management of such devices. This technique is also employed in main memory such as shown in U.S. Pat. No. 4,047,160, which has a bit indicating an unallocated or free register. While a separate indicator for each unit of free space may be efficient and fast for main memory applications, scanning the VTOC's of a plurality of large capacity storage devices is quite time consuming; hence, inefficient. Accordingly, it is necessary to provide a new control mechanism for managing space on this type of storage device.

It is also desired to maximize efficiency of storage devices based upon balancing the loads between the various storage devices. This is particularly important not only in plural main memories but also in peripheral input/output type of storage devices, commonly referred to as peripheral devices. U.S. Pat. No. 3,702,006 shows a load-balancing technique for peripheral devices. This particular technique is not related to the inventive concept to be described in this document; however, it does show a way of balancing peripheral device operations. It is now desired to provide load balancing peculiarly adaptable to data streaming, i.e., large data transfers between a plurality of devices with techniques for ensuring the successful completion of such extended data transfers.

It would certainly be advantageous if a simple control mechanism and method could achieve, in many applications involving data streaming, all of the above desired goals. An example of such data streaming control is the migration of data sets between peripheral storage apparatus volumes, such as from a 3380 disk apparatus to a 3850 Mass Storage System, when a data set becomes less active.

SUMMARY OF THE INVENTION

In accordance with the invention, in a machine-implemented method or an apparatus for balancing activity of a plurality of data storage devices, such device has a plurality of allocatable memory segments or sections for keeping a running tally for each of the storage devices indicating the number of unallocated memory segments; means then allocate new work to said storage devices based upon the free space tallies, including biasing all of the work allocations to those storage devices with the larger unallocated space tally. The above operation is achieved independently of the capacity of the devices. Also, a machine-implemented method and apparatus for balancing the work among a plurality of peripheral devices includes measuring the storage space that is currently not being used at each device, and then using those devices with a maximal unused storage space as devices for storing data signals.

In another aspect of the invention, in either a single or multihost environment, a single central record contains the identification of all the storage devices, together with an indication of the free space on the respective storage devices. For each prospective allocation of space, the control record is scanned for the storage device having the largest free space, with subsequent allocation occuring with the identified device. That is, a central record for all of the hosts is kept for facilitating allocation of space of a large plurality of storage devices. For each actual allocation or deallocation, the free space is adjusted in accordance with the size of the allocated or deallocated space.

The foregoing and other objects, features and advantages of the invention will be apparent from the following more particular description of preferred embodiments of the invention, as illustrated in the accompanying drawings.

DETAILED DESCRIPTION

Figure 1:
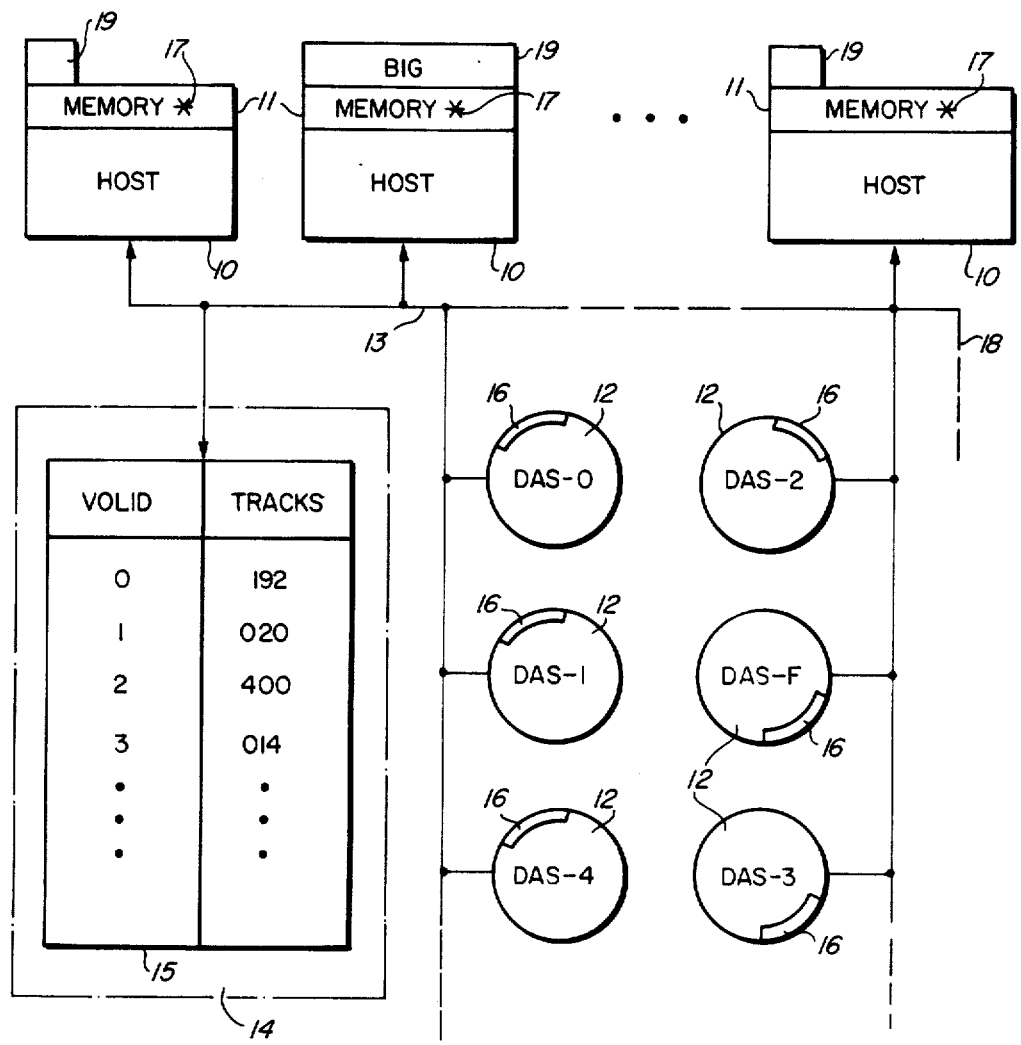
FIG. 1 is a simplified diagram showing a multihost data processing system employing the teachings of the present invention.

Referring now more particularly to the drawing, like numerals indicate like parts and structural features in the various diagrams. FIG. 1 illustrates a data processing system employing a plurality of hosts 10. Each host 10 may be one or more central processing units, a virtual processor in a virtual machine environment, or the like. Associated with each host 10 is a so-called main memory or main memory portion 11. Each of the memories 11 may be dedicated to a single host, as shown, or may be shared by one or more hosts. For a host that is a virtual machine, memory 11 is that portion of the actual main memory in a central processing unit that is allocated to that virtual machine.

Figure 2:
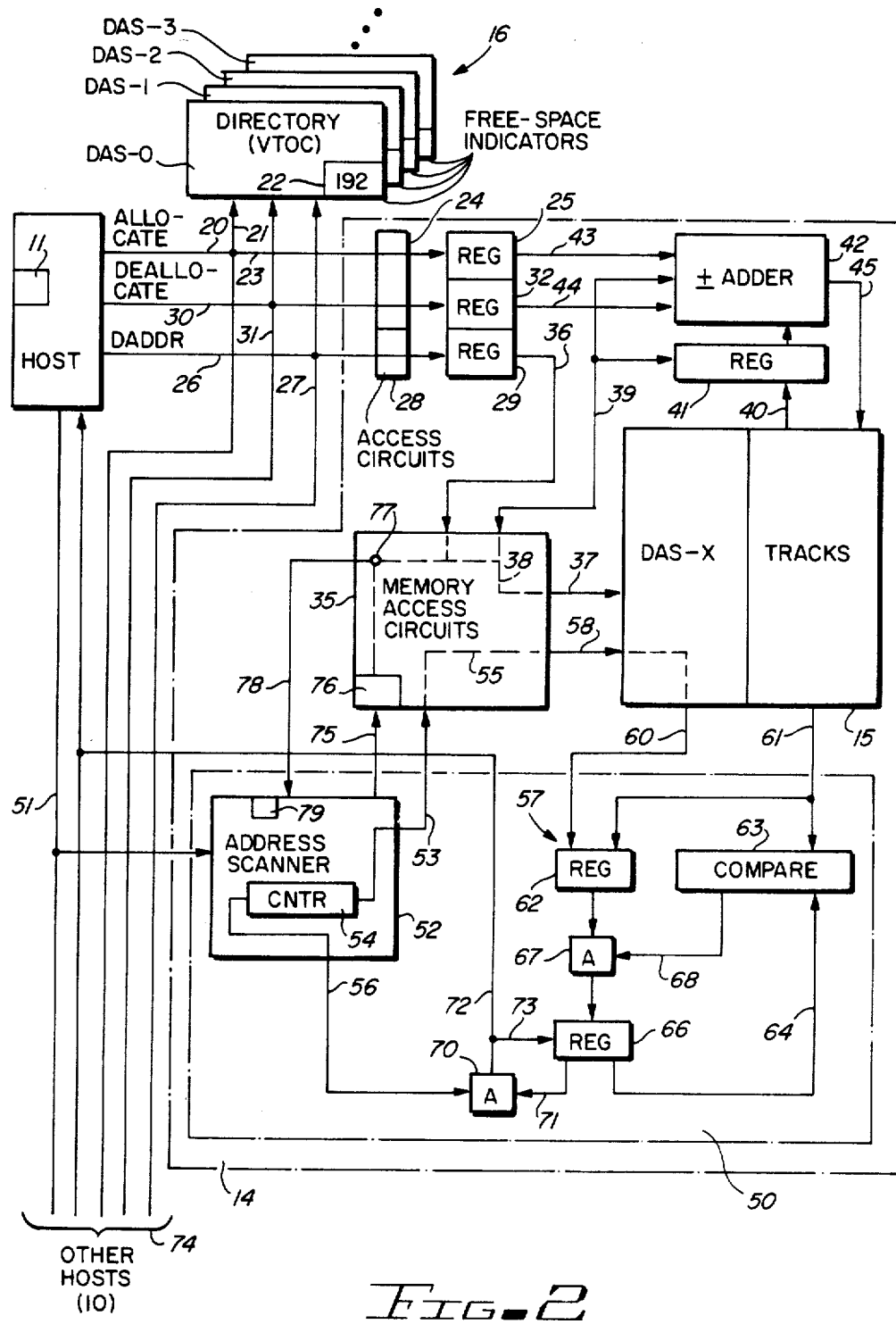
FIG. 2 is a block diagram showing a central controller usable with the FIG. 1-illustrated system for employing the present invention.

Typically, in a multihost data processing system, a shared peripheral memory system is employed. These shared memory systems can employ diverse types of memory devices. In a typical multihost data processing system (no limitation to application of the invention intended to multihost environment intended), a direct-access storage device (DASD, also referred to as DAS) is employed in a shared manner. A plurality of such DASD 12 are shown as being attached to the plurality of hosts 10 via a peripheral connection 13. Connection 13 may be of the bus type, or input/output channels, as is known in the data processing art. Typically, computer programs are stored in one or more of the DASDs 12 for paging into a memory 11 of a given host 10. Asterisks 17 indicate the residency of computer programs within memories 11. Such computer programs can include program steps which implement certain aspects of the present invention, as will become apparent. Of course, electronic circuitry, as shown in FIG. 2, can also be employed to successfully practice the invention.

The FIG. 1-illustrated DASDs 12 are so-called secondary memory devices. That is, these contain the data sets that are not the most active data sets in the multihost environment. Numeral 18 indicates the connection to the primary storage devices (not shown) which are operationally tightly coupled to the host 10, as is well known in the data processing art. For example, numeral 18 can indicate the IBM 3380 disk storage apparatus, while a numeral 12 indicates the IBM 3330 disk storage apparatus or the virtual disk storage apparatus of the IBM 3850 Mass Storage System.

Figure 3:
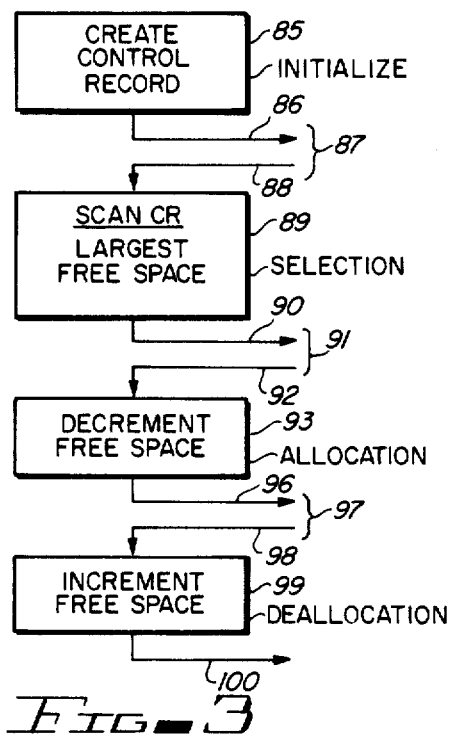
FIG. 3 is a flow diagram illustrating four elements of a machine-implemented method of the present invention as practiced in the FIG. 1-illustrated embodiment.
Figure 5:
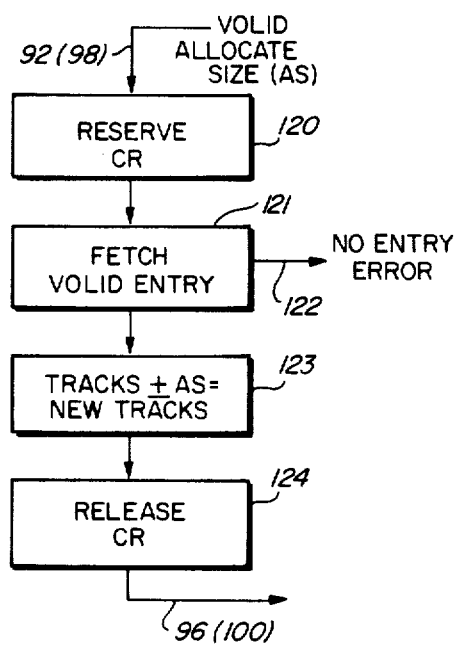
FIG. 5 is a flow chart illustrating updating a control record in accordance with the steps of FIG. 3.
Figure 4:
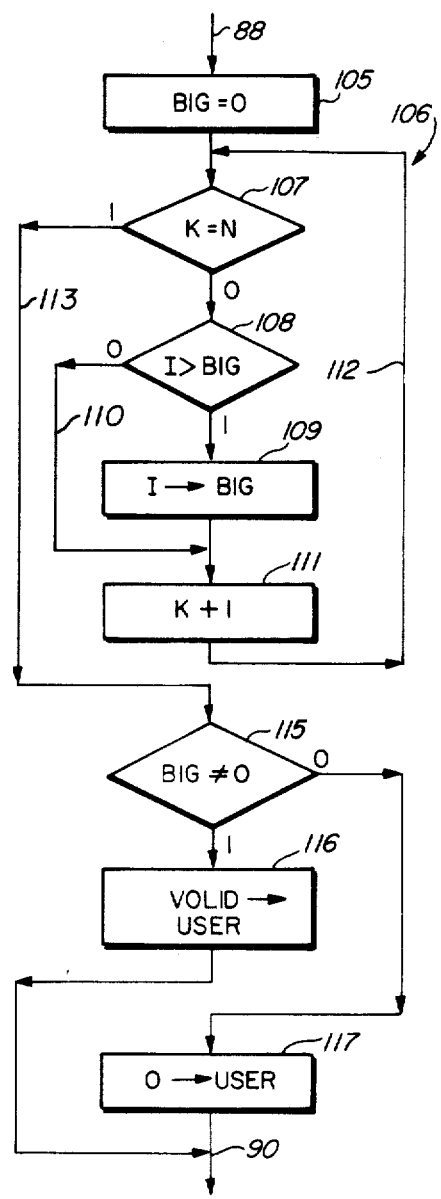
FIG. 4 is a flow chart illustrating identification of a memory device having the largest free space as required in the method of FIG. 3.

Each DASD 12 has a volume table of contents (VTOC) 16 which contains control information identifying inter alia free space on the storage device. In a constructed embodiment of the invention, free space is indicated to the granularity of DASD tracks. In practicing the present invention in its preferred form, the capacity of each storage track on a device is not considered in allocating space in accordance with the present invention. It is understood that such capacities can be taken into consideration while practicing the present invention; this particular variation is not described. The present invention can be practiced by scanning all VTOCs 16 of all the secondary storage devices 12 for determining which storage device 12 has the greatest number of unallocated tracks. This is time consuming and, hence, inefficient. Accordingly, a direct-access storage device can be designated as a central record (CR) receiving storage device for accumulating all volume identifications (VOLID) corresponding to the DASDs 12, together with an enumeration of the free space expressed in tracks of the respective devices. A random-access memory can also be provided, or a central controller, as shown in FIG. 2, can be employed instead of program steps, as shown in FIGS. 3 through 5, for implementing the invention.

In FIG. 1, numeral 14 indicates the central record control, while numeral 15 indicates the central record itself. Central record 15 has two columns; a left column contains the VOLID of the storage devices 12. The VOLID is indicated as beginning with numeral zero, it being understood that numeral zero, in a practical embodiment, will not be represented by an all-zero number, but rather by some code corresponding to zero in the FIG. 1 illustration. A second column in record 15 includes the number of tracks that are currently unallocated in the devices 12 identified by the respective VOLIDs. As will become apparent, when the multihost system of FIG. 1 is initialized to use the present invention, the VTOCs 16 are all scanned for the number of free tracks of the respective devices 12 to be stored in central record 15, together with the VOLID of the device. When the record 15 is stored on a DASD, initialization occurs only once. When a device 12 is added to the multihost environment, a new entry is made in record 15; when a device 12 is removed, the entry is erased.

When allocating space from the devices 12 using record 15, each of the memories 11 will have a register 19 termed BIG which contains the VOLID of a device 12 having a largest number of unallocated tracks. As shown in FIG. 1, the device having VOLID 2 has 400 tracks; and hence, after scanning record 15, a host 10 requesting a prospective allocation will contain VOLID 2 in its BIG register 19. The actual allocation then occurs, with the allocating host accessing record 15 for diminishing the free-space track counts by the allocation size (AS), such that record 15 currently and truly represents the number of free or unallocated tracks in the device 12. BIG registers 19 may have different VOLID; that is, plural hosts 10 may have successive scans of CR 15 looking for plural devices 12. In a similar manner, upon deallocation, the number of tracks deallocated are added to the free-track tally of record CR 15. VOLID 0 corresponds to DAS-0 12, VOLID 1 corresponds to DAS-1 12, all in FIG. 1. Not all of the devices 12 indicated in FIG. 1 are shown on the record 15. Those devices 12 not listed are represented by the two ellipses.

Using the machine-implemented method of the invention, it is seen that the DASDs 12 having the largest capacity will initially have the largest number of free tracks. Accordingly, the larger devices will initially receive most allocations. Since the newer-design devices generally have a faster access, total system performance can be enhanced by biasing operations toward these newer devices. In this manner, allocation based upon free space independent of the capacity tends to use newer devices to the exclusion of older devices; hence, it is an inexpensive technique for minimizing data processing impact of using new devices in preparation for discarding older devices.

In addition to having any of the hosts 10 execute a program for implementing the invention, a single common control 14, which includes table 15, may be employed for practicing the present invention. Referring next to FIG. 2, such a common control is described. An allocate bus 20 extending from a host 10 carries VOLID and AS (allocation size) indicating signals. The allocating host 10 accesses a VTOC directory via bus 21 for updating the free-space indicator 22 in the respective VTOC 16. As an example, free-space indicator 22 of VTOC 16 for DAS-0 is diminished by a given allocate request. It must be borne in mind that this allocate request, when practicing the present invention, occurs after the later-described scan of record 15. The allocate request not only affects VTOC 16, which is altered in accordance with known techniques of accessing a DASD 12, fetching the VTOC, updating it, and returning it to the DASD, but it also travels over bus 23 to reception circuits 24. Reception circuits 24 are gating circuits activated by a device address (DADDR) signal on bus 26 and received by access circuits 28. Access circuits 28 gate the received allocate request signals (VOLID and AS) to register 25 for memorization within control 14. These memorized signals are supplied over bus 43 to a plus/minus adder 42, as later described. The DADDR signals on bus 26 also travel over bus 27 to the DASD 12 devices for selecting which device is to receive the allocate request. Access circuits 28 transfer the received DADDR (device address) signals from bus 26 to register 29, which memorizes the same. The signals in register 25 and register 29 enable central control 14 to update record 15 in accordance with the allocate request. A similar action occurs for the deallocate request transferred over bus 30 with signals indicating VOLID and deallocate size. Bus 31 represents the alteration of the appropriate VTOC 16 free-space indicator 22. Register 32 captures the deallocate information VOLID and AS for use by central control 14.

Record 15 is in a random-access memory also represented by the symbol 15. Memory access circuits 35 control access to the record memory 15 using known memory access technique for random-access memory. The address to be accessed is indicated by the signals of register 29 traveling over bus 36 which are decoded by memory access circuits 35, as indicated by dash line 38. The actual register selection signal travels over bus 37 to the record memory 15. The VOLID identifies which register is to be accessed. In the alternative, a content addressable memory may be employed where the VOLID is compared with the contents of the registers, and the tracks associated with the VOLID are read out automatically, as is known. When memory access circuits 35 receive a device address from register 29, the circuits interpret the same as a request to do an update. Accordingly, receipt of circuits from bus results in an actuation signal being transferred over line 39 to register 41 for receiving the free-track-number read out from record memory 15. Register 41 temporarily memorizes the free space for the one VOLID and supplies same as the augend/minuend signal to plus/minus adder 42. The other inputs to adder 42 are received from either register 25 or 32 via buses 43, 44 respectively. Buses 43, 44 supply the addend and subtrahend signals to conventional adder 42, which then supplies the resultant signals over bus 45 back to record memory 15. Memory access circuits 35 have maintained the address selection signals over bus 37. Therefore, the resultant signals replace the original augend/minuend signals fetched from record memory 15. In the alternative, adder 42 can be two cascaded adders such that an allocate and deallocate can be handled for a given device address at the same time. The usual lockup circuits for preventing multiple accesses to central control 14 are not shown for simplicity purposes. The above shows the additive and subtractive alterations of free space based upon deallocation and allocation.

To determine which DASD 12 has the largest number of unallocated tracks, a requesting host 10 actuates central control 14 scan-compare circuits 50 to scan the record 15 and do a compare with the present BIG indication, such as the indication stored in one of the registers 19 of FIG. 1. In this regard, register 66 of scan-compare circuits 50 contains the signals to be stored in the requesting host's 10 BIG register 19. The host 10 initiates the scan-compare function by supplying a signal over line 51 to VOLID address scanner 52.

Line 51 may be a separate physical line or may be a command supplied over a typical input/output connection, such as employed with the IBM 370 line of digital computers. In any event, the request signal on line 51 activates address scanner 52 to scan each and every entry (register) of record 15. Scanner 52 supplies successive addresses over bus 53 to memory access circuits 35 for accessing all of the registers within record memory 15. It should be noted that memory access circuits 35 will have the usual lock mechanism (not shown) associated with accessing random-access memories. Returning to the scan-compare function, address scanner 52 includes a binary counter 54 for generating the successive addresses. The generated addresses are transferred through memory access circuits 35 as indicated by dash line 55 to generate selection signals supplied over bus 58 to record memory 15. In a practical embodiment, buses 37 and 58 may be combined. The selected addresses (VOLID) of the DASD 12 are transferred from record 15 over bus 60, while the free-space indication is transferred over bus 61 from record 15 to scan-compare circuits 50. The compare portion 57 of scan-compare 50 is activated by an end carry, or borrow, from counter 54 as supplied over line 56.

The VOLID signal from bus 60 is captured in compare circuits 57 by register 62. Along with the VOLID, the number of free tracks indicated by the signals on bus 61 are also memorized in register 62. Greater-than compare circuit 63 compares the signals from bus 61 with the signals from a register 66 to determine which number represented by the signals is the larger of the two. In this manner, register 66 always contains the VOLID and the number of free tracks for the DASD 12 having the largest number of free, or unallocated, tracks identified in record 15 up to the point of the scan, as indicated by counter 54.

When the greater-than compare circuit 63 finds the signals on bus 61 representing a number greater than the number of free tracks indicated in register 66, an activating signal is supplied over line 68 to AND circuits 67 to transfer the signal contents of register 62 to replace the present signal contents of register 66. In this manner, register 66 is automatically updated whenever the last read entry from record 15 has a free-track indication greater than all previously scanned entries. Upon completion of the scan, as indicated by the end carry from counter 54, register 66 contains the VOLID and the amount of free space for that VOLID, as indicated in central memory or record 15. AND circuits 70 are opened by the end carry on line 56 to pass the VOLID signals from register 66 over bus 71 to bus 72, thence to a host 10. The supplying of signals by AND circuits 70 results in a clear signal being supplied over line 73 to clear the contents of register 66 to zero in preparation for a next subsequent scan. As indicated by the bracket 74, control 14 is connected to all of the hosts 10. Again, the lock circuits (not shown) between the multihosts 10 follow usual designs for access to shared resources, as widely practiced in the data processing art.

Accordingly, in accordance with the invention, a central control is provided for controlling allocation of memory in a plurality of memory devices in accordance with the number of free memory segments of those respective memory devices. The control effected by central control 14 is in a preferred form, distributed to all of the hosts 10, as a computer program which is independently executed by the diverse hosts 10. All of the functions of updating based upon allocation/deallocation and of the scan-compare function are performed by a host 10 execution of a computer program, as described next with respect to FIGS. 3 through 5.

FIG. 3 shows a four-step process used in the machine-implemented method of practicing the present invention. To initialize a multihost environment for practicing the invention, a create control record step 85 is first performed. The creation of a control record requires that control statements furnished by an operator have a list of all storage devices to be managed by practicing the present invention. Step 85 also scans all VTOCs 16 of the storage devices 2 identified in the control statements for fetching the contents of the free-space indicators 22 from all of the VTOCs 16 of the identified devices. Then record 15 then is created with each VOLID being a portion of the entry, and the VTOC 16, supplied free-space indication being a corresponding portion of the entry of each of the VOLID. Accordingly, the common record 15 may contain identification of all of the storage devices in a multihost environment or a selected portion of such storage devices. The control record is created within a storage device which may or may not be managed in accordance with the present invention, but which is accessible by any and all of the hosts 10 which participate in practicing the invention. That is, some but not all of the hosts in a multihost environment may be employed when practicing the present invention. In one constructed embodiment, the record 15 was stored on a DASD 18, i.e., an often-used data set. In another embodiment, record 15 is stored in the random-access memory which is shared by the hosts participating in practicing the present invention. Upon completion of the record creation, the host that created the record (can be any of the hosts 10) returns to other computer processes or programs, as indicated by arrow 86, with the other processes or programs being represented by bracket 87.

As the multihost data processing system performs various data processing functions, a need arises for space allocation on a device managed in accordance with practicing the present invention. Accordingly, as represented by numeral 88, scan control record step 89 is performed for device selection for the prospective allocation. Step 89 results in identifying the VOLID having the largest free space, as more clearly described with respect to FIG. 4. Upon identifying the VOLID representing the device having the greatest number of unallocated tracks, the host 10 which is handling the prospective allocation returns to other programs via arrow 90, the other programs being represented by bracket 91. Such other programs may include allocation routines of known design, which will include activation of the allocation step portion 93 of the allocation routine, which results in updating record 15 for an allocate step. This action amounts to decrementing the free-space tally of record 15. Upon such decrementation, host 10 returns to other programs 97, as indicated by arrow 96. The allocation is actually made with the space being used in accordance with the desires of the activating program (not shown). At some other time, some space of the managed devices 12 may result in a deallocation, i.e., a data set is being scratched. Accordingly, step 99 is activated, as indicated by arrow 98, to increment the free-space indications of record 15 in accordance with the deallocation size. Return to other programs is indicated by arrow 100. FIG. 5 shows the record is updating functions performed within steps 93, 99 respectively for allocation and deallocation.

FIG. 4 illustrates the details of step 89. Entry at 88 results in BIG register 19 being set to zero at 105. The register 19 is the register associated with the host 10 having a prospective allocation. Next, a DO loop 106 is performed which scans the contents of record 15 to identify the VOLID having the largest number of free or unallocated tracks. The indexing step 107 compares the number of scans performed by the DO loop 106 with the number of steps to be performed. If the number of steps is less than the maximum number, then at 108 the contents of the entry I that was just read by the DO loop from record 15 are compared with the contents of BIG register 19. If the entry has a free-track space greater than the contents of BIG, then at 109 the contents of the just-read entry I is transferred to BIG 19, replacing the previous entry. On the other hand, if the contents of BIG free-space indication is greater than or equal to I, then the program of host 10 follows path 110, bypassing the transfer to BIG. At 111, the count is incremented by unity, with return to step 107 being made via path 112. Exit from the DO loop is via path 113 when the number of repetitions in the scan is equal to the number of entries in record 15. At 115, the signal contents of BIG 19 is examined. If it is non-zero, the VOLID portion of the BIG 19 register is transferred to the user program at 116. If, on the other hand, the contents of BIG is zero, i.e., there is no free space, then an all-zeroes indication is supplied to the user program at 117. This indicates that no space can be allocated. Exit from the routine is at step 90.

FIG. 5 indicates the incrementation and decrementation of record 15 free-track indications. Entry to the steps 92 or 98 includes identification of the VOLID involved, i.e., the device address for accessing the appropriate entry of record 15 as well as identifying which VTOC 16 is to be used, plus the allocation size AS. The allocation size refers both to allocation and deallocation. First, the control record 15 is reserved at 120. When the record is on a DASD 12 or 18, then that device is reserved for the process shown in FIG. 5. At 121, the entry associated with the VOLID is fetched. If there is no entry in the control record 15, an error is indicated at 122. Recovery from such error is beyond the scope of the present description. Following step 121 in an error-free condition, the number of tracks in the entry of record 15 is altered by the number AS, in accordance with an allocation or deallocation, to get a new track number 123. Then, at 124 the control record is released, with return to other programs being via arrow 96 for an allocate and 100 for a deallocate.

In practicing the present invention, serialization of the common resource control record 15 is important. That is, once the device 12 having the largest number of free tracks is identified, the host concerned with the prospective allocation is protected since the number of free tracks has already been altered. Hence, the next prospective allocation resulting in a scan-compare function will see the entry after the first requesting host has completed its scan-compare function, even though the allocation routine by the first requesting host has not yet been implemented. Accordingly, the above-described simple control mechanism not only provides for all of the functions listed in the Background of the Invention, but also automatically provides serialization of the common control mechanism, which is an important feature in a multihost, multiprogram environment.

While the invention has been particularly shown and described with reference to preferred embodiments thereof, it will be understood by those skilled in the art that various changes in form and details may be made therein without departing from the spirit and scope of the invention.

What is claimed is:

1. The machine-implemented method of balancing activity of a plurality of peripheral data storage devices having diverse data storage capacities, each device having a plurality of allocatable memory segments, including the steps of:

maintaining a running tally for each of said plurality of data storage devices for indicating the number of currently unallocated memory segments therein;

memorizing said running tallies for all of said storage devices in a central data memory, such that the memorization is a running tally for all of said unallocated memory segments in all of said data storage devices;

executing a program of instructions, in any one of a plurality of hosts using said storage devices, that examines said tallies and determines and identifies which of said storage devices has the greatest tally;

allocating new work to said storage devices in a sequence based upon said tallies including biasing said work allocations to those storage devices with larger unallocated memory segment tallies; and in allocating new work to said storage devices, scanning said central memory for a largest one of said memorized tallies, identifying a one of said storage devices as the storage device having the largest unallocated space and allocating work to said identified one of said storage devices.

2. The machine-implemented method of operating a multihost data processing system having a plurality of hosts connected to a first plurality of peripheral data storage devices, a second plurality of channels connecting said hosts to predetermined ones of said peripheral data storage devices, said first plurality not being greater than said second plurality, the steps of:

indicating the amount of free data storage space in each of said data storage devices irrespective of the storage capacity of said data storage devices;

storing all of said indications together with identifications of the data storage devices, respectively, in a central data storage device accessible by all of said hosts;

identifying a one of said storage devices as having a greater amount of indicated free data storage space; and allocating data storage space from said identified storage device for a one of said hosts such that larger-capacity ones of said data storage devices tend to receive data signals prior to smaller-capacity ones of said data storage devices.

3. The machine-implemented method of balancing activity of a first plurality of peripheral data storage volumes having respective diverse data storage capacities, each data storage volume having a plurality of allocatable memory segments, including the steps of:

keeping a running tally for each of said data storage volumes for indicating a number of the respective unallocated memory segments in each such data storage volumes;

separately storing said tallies for all of said data storage volumes in a central data memory as memorized tallies such that said memorized tallies are a running tally of unallocated memory segments for all of said data storage volumes;

allocating said unallocated memory segments in said data storage volumes to new data to be stored in respective ones of said data storage volumes in an order of volume selections beginning with the volume having a largest one of said tallies and independently of said diverse data storage capacities and subsequent volumes having successively smaller tallies in a sequence proceeding toward identifying a volume having a smallest one of said tallies;

for allocating said data storage volumes to said new data, scanning said central memory for finding a largest one of said memorized tallies, and identifying one of said data storage volumes having said found largest memorized tally as the allocated volume for said new data.

4. A data processing system having multiple data storage devices (12) having diverse data storage capacities, each said data storage device incorporating its own volume table of contents (16) (hereinafter referred to as the "VTOC"), and for accommodating multiple potential users (10) of such devices together with a storage device management facility means characterized in that:

(a) said management facility means having first means for maintaining a single table (15) as a serial reusable resource to separately store for each said data storage device, its identity (VOLID), together with a unit measure of its unassigned data storage capacity (TRACKS); and (b) said management facility means having second means for responding to a user request for data device storage by searching said table for the device identity (VOLID) associated with the greatest unit measure of unused capacity (TRACKS) independently of said diverse data storage capacities, and assigning the so-identified data storage device to the requesting user.

5. A data processing system as claimed in claim 4, including multiple host processors, a plurality of channels connecting said multiple host processors to said multiple data storage devices, said management facility means being distributed among the host processors and said single table (15) being collectively maintained in commonly accessible storage, writing access to the table being conditional upon the host being able to access the table.

6. The machine-implemented method set forth in claim 2, further including the steps of:

upon each allocation in said data storage devices, updating said indications of free data storage space in the respective said data storage devices to reflect said allocation and also updating said storage of said indications in said central data storage device to reflect said allocation such that the stored indications are a running tally of free space for all of said data storage devices; and upon needing an allocation of data storage space in any one of said data storage devices performing said identifying and allocating steps for each said needed allocation.

7. The machine-implemented method set forth in claim 3, wherein a plurality of host processors are connected to said first plurality of data storage devices via a second plurality of channels, said second plurality not being greater than said first plurality;

further including the steps of:

upon each allocation in said data storage devices, updating said indications of unallocated memory segments in the respective said data storage devices to reflect said allocation and also updating said memorized tallies; and upon needing an allocation of data storage space in any one of said data storage devices performing said scanning step and then said allocating step.

* * * * *